US010663039B2

(12) United States Patent
Okamoto et al.

(10) Patent No.: US 10,663,039 B2
(45) Date of Patent: May 26, 2020

(54) VARIABLE SPEED ACCELERATOR AND METHOD FOR CONTROLLING VARIABLE SPEED ACCELERATOR

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Nakashima, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 16/093,030

(22) PCT Filed: Jun. 15, 2016

(86) PCT No.: PCT/JP2016/067770
§ 371 (c)(1),
(2) Date: Oct. 11, 2018

(87) PCT Pub. No.: WO2017/216899
PCT Pub. Date: Dec. 21, 2017

(65) Prior Publication Data
US 2019/0170221 A1 Jun. 6, 2019

(51) Int. Cl.
*F16H 3/72* (2006.01)
(52) U.S. Cl.
CPC ............... *F16H 3/725* (2013.01); *F16H 3/72* (2013.01); *F16H 2200/201* (2013.01)
(58) Field of Classification Search
CPC ................................... F16H 3/72; F16H 3/725
See application file for complete search history.

(56) References Cited

U.S. PATENT DOCUMENTS 6,018,694 A      1/2000   Egami et al.
7,207,919 B2 *   4/2007   Tsuneyoshi ............ B60K 6/445
                                                         477/5
(Continued)

FOREIGN PATENT DOCUMENTS

JP    H04-060254 A    2/1992
JP    H09-211015 A    8/1997
(Continued)

OTHER PUBLICATIONS

Non-Final Office Action in corresponding U.S. Appl. No. 16/093,005, dated Jul. 11, 2019 (20 pages).
(Continued)

*Primary Examiner* — Derek D Knight
(74) *Attorney, Agent, or Firm* — Osha Liang LLP

(57) ABSTRACT

A variable speed accelerator includes: an electric driving device; and a transmission device changing the speed of a rotational driving force generated by the electric driving device and transmits the changed rotation driving force to a driving target. The transmission device includes: a sun gear; a sun gear shaft fixed to the sun gear; a planetary gear that meshes with the sun gear; an internal gear that meshes with the planetary gear; a planetary gear carrier including a planetary gear carrier shaft; and an internal gear carrier including an internal gear carrier shaft. The electric driving device includes: a constant-speed motor including a constant-speed rotor; and a variable-speed motor including a variable-speed rotor. The variable speed accelerator further includes: a rotation rate controller that issues a speed instruction; a torque measuring device; and a control device holding an instruction value of the speed instruction.

5 Claims, 7 Drawing Sheets

(56) References Cited

U.S. PATENT DOCUMENTS

| | | | |
|---|---|---|---|
| 7,609,011 B2 * | 10/2009 | Yatabe | B60K 6/445 |
| | | | 318/140 |
| 10,177,692 B2 * | 1/2019 | Kobayashi | H02K 7/003 |
| 10,454,394 B2 * | 10/2019 | Okamoto | H02K 9/06 |
| 10,465,774 B2 * | 11/2019 | Okamoto | F16H 61/02 |
| 2003/0064847 A1 * | 4/2003 | Oshidari | B60K 6/365 |
| | | | 475/5 |
| 2005/0113201 A1 * | 5/2005 | Kimura | F16H 3/724 |
| | | | 475/5 |
| 2006/0101942 A1 | 5/2006 | Onishi et al. | |
| 2007/0155570 A1 * | 7/2007 | Kimura | F16H 3/724 |
| | | | 475/153 |
| 2017/0155345 A1 * | 6/2017 | Kobayashi | H02P 6/04 |
| 2018/0187778 A1 * | 7/2018 | Okamoto | F16H 3/724 |
| 2018/0252300 A1 * | 9/2018 | Okamoto | F16H 61/0246 |
| 2019/0048979 A1 * | 2/2019 | Okamoto | F16H 3/724 |
| 2019/0068090 A1 * | 2/2019 | Okamoto | F04D 25/028 |
| 2019/0093742 A1 * | 3/2019 | Okamoto | F16D 41/185 |
| 2019/0113111 A1 * | 4/2019 | Okamoto | H02K 9/06 |
| 2019/0181779 A1 * | 6/2019 | Okamoto | F16H 3/72 |
| 2019/0186600 A1 * | 6/2019 | Miyata | F16H 3/72 |
| 2019/0226557 A1 * | 7/2019 | Okamoto | F16H 3/72 |

FOREIGN PATENT DOCUMENTS

| | | |
|---|---|---|
| JP | H10-238381 A | 9/1998 |
| JP | 2004 150609 A | 5/2004 |
| JP | 2004-150609 A | 5/2004 |
| JP | 4472350 B2 | 6/2010 |
| JP | 2010 242811 A | 10/2010 |
| JP | 2010-242811 A | 10/2010 |
| WO | 2016-010146 A1 | 1/2016 |

OTHER PUBLICATIONS

International Search Report issued in corresponding International Application No. PCT/JP2016/067764, dated Aug. 23, 2016 (4 pages).

Written Opinion of the International Searching Authority issued in corresponding International Application No. PCT/JP2016/067764, dated Aug. 23, 2016, with translation (10 pages).

International Search Report issued in corresponding International Patent Application No. PCT/JP2016/067770, dated Sep. 6, 2016 (2 pages).

Written Opinion issued in corresponding International Patent Application No. PCT/JP2016/067770, dated Sep. 6, 2016 (6 pages).

* cited by examiner

VARIABLE SPEED ACCELERATOR AND METHOD FOR CONTROLLING VARIABLE SPEED ACCELERATOR

FIELD OF THE INVENTION

The present invention relates to a variable speed accelerator which includes an electric driving device including a constant-speed motor and a variable-speed motor, and a planetary gear transmission device for changing the speed of a rotational driving force generated by the electric driving device and then transmitting the speed-changed rotational driving force to a driving target, and a method for controlling a variable speed accelerator.

BACKGROUND ART

As an apparatus for driving a rotary machine such as a compressor, there is an apparatus including an electric driving device for generating a rotational driving force and a transmission device for changing the speed of a rotational driving force generated by the electric driving device and then transmitting the speed-changed rotational driving force to the rotary machine.

Patent Document 1 discloses that a constant-speed motor and a variable-speed motor for speed change are used as the electric driving device and a planetary gear transmission device is used as the transmission device to accurately control a gear ratio. In this apparatus, it is possible to change a rotation rate of an output shaft of the planetary gear transmission device connected to the rotary machine by changing a rotation rate of the variable-speed motor.

CITATION LIST

Patent Document

[Patent Document 1]
  Japanese Patent Publication No. 4472350

SUMMARY OF INVENTION

Technical Problem

However, when it is intended to suddenly lower the rotation rate of the variable-speed motor or the load of the compressor to be driven suddenly drops, a direction of the torque of the variable-speed motor may be opposite to a direction of the normal torque. The direction of the normal torque is a direction of the torque of the variable-speed motor when the variable-speed motor 71 in the powering state rotates an output shaft (compressor) of the variable speed accelerator (transmission device) at a maximum rotation rate.

When the direction of the torque of the variable-speed motor is opposite to the direction of the normal torque, teeth constituting a drive gear driven by the variable-speed motor reversely contact with teeth constituting a driven gear of the transmission device which meshes with the drive gear. The term "reverse contact" refers to a phenomenon in which a surface transmitting a force of the variable-speed motor among both surfaces of the drive gear facing the circumferential direction of the teeth becomes opposite to a surface transmitting a force in the normal torque direction.

The drive gear and the driven gear which transmit a driving force of the variable-speed motor to the transmission device may be structured to be unsuitable for reverse contact, thereby transmitting a larger force. Therefore, it is desired to prevent unintended reverse contact of a gear.

The present invention relates to a variable speed accelerator which includes an electric driving device including a constant-speed motor and a variable-speed motor, and a planetary gear transmission device for changing the speed of a rotational driving force generated by the electric driving device and then transmitting the speed-changed rotational driving force to a driving target, and it is an object of the present invention to provide a variable speed accelerator capable of preventing reverse contact of a drive gear driven by a driving force of a variable-speed motor.

Solution to Problem

According to a first aspect of the present invention, a variable speed accelerator is provided, including an electric driving device which generates a rotational driving force, and a transmission device which changes the speed of the rotational driving force generated by the electric driving device and transmits the changed rotation driving force to a driving target, wherein the transmission device includes a sun gear which rotates about an axis, a sun gear shaft which is fixed to the sun gear and extends in an axial direction around the axis, a planetary gear which meshes with the sun gear, revolves around the axis and rotates about its own center line, an internal gear which has a plurality of teeth aligned annularly around the axis and meshes with the planetary gear, a planetary gear carrier which has a planetary gear carrier shaft extending in the axial direction around the axis and supports the planetary gear to revolve around the axis and to be rotatable around a center line of the planetary gear itself, and an internal gear carrier which has an internal gear carrier shaft extending in the axial direction around the axis and supports the internal gear to be rotatable about the axis, the sun gear shaft forms an output shaft connected to the driving target, the internal gear carrier shaft forms a constant-speed input shaft, and the planetary gear carrier shaft forms a variable-speed input shaft, the electric driving device includes a constant-speed motor having a constant-speed rotor which rotates a constant-speed input shaft of the transmission device in a second direction, and a variable-speed motor which has a variable-speed rotor connected to the variable-speed input shaft of the transmission device and which rotates the output shaft at a maximum rotation rate by rotating the variable-speed rotor at a maximum rotation rate in a first direction opposite to the second direction, and the variable speed accelerator further includes a rotation rate controller which issues a speed instruction to the variable-speed motor and controls a rotation rate of the variable-speed motor, a torque measuring device which measures a torque of the variable-speed motor, and a control device which holds an instruction value of the speed instruction or reduces a rate of change of the instruction value of the speed instruction to below a rate of change of the instruction value of the speed instruction at that time when a torque direction of the variable-speed motor is the second direction.

According to such a constitution, it is possible to prevent reverse contact of a drive gear and a driven gear driven by the variable-speed motor during an operation of the variable speed accelerator.

According to the variable speed accelerator, in an orthogonal coordinate system indicating a four quadrant operation in which a torque directed in the first direction of the variable-speed motor is indicated on a vertical axis and a rotation rate in the first direction of the variable-speed motor is indicated on a horizontal axis, the control device may hold the instruction value of the speed instruction or may reduce the rate of change of the instruction value of the speed instruction below a rate of change of the instruction value of the speed instruction at that time when the rotation rate of the variable-speed motor and the torque of the variable-speed motor are in the third quadrant and the fourth quadrant in which the torque is negative.

According to such a constitution, the reverse contact of the gear can be more reliably prevented by monitoring not only the torque of the variable-speed motor but also the rotation rate of the variable-speed motor.

In the variable speed accelerator, the variable-speed rotor may have a cylindrical shape centered on the axis, and the constant-speed input shaft may be inserted through a shaft insertion hole which passes therethrough in the axial direction.

According to a second aspect of the present invention, a method is provided for controlling a variable speed accelerator which includes an electric driving device which generates a rotational driving force, and a transmission device which changes the speed of the rotational driving force generated by the electric driving device and transmits the changed rotation driving force to a driving target, and wherein the transmission device comprises a sun gear which rotates about an axis, a sun gear shaft which is fixed to the sun gear and extends in an axial direction around the axis, a planetary gear which meshes with the sun gear, revolves around the axis and rotates about its own center line, an internal gear which has a plurality of teeth aligned annularly around the axis and meshes with the planetary gear, a planetary gear carrier which has a planetary gear carrier shaft extending in the axial direction around the axis and supports the planetary gear to revolve around the axis and to be rotatable around a center line of the planetary gear itself, and an internal gear carrier which has an internal gear carrier shaft extending in the axial direction around the axis and supports the internal gear to be rotatable about the axis, the sun gear shaft forms an output shaft connected to the driving target, the internal gear carrier shaft forms a constant-speed input shaft, and the planetary gear carrier shaft forms a variable-speed input shaft, and the electric driving device includes a constant-speed motor having a constant-speed rotor which rotates a constant-speed input shaft of the transmission device in a second direction, a variable-speed motor which has a variable-speed rotor connected to the variable-speed input shaft of the transmission device and which rotates the output shaft at a maximum rotation rate by rotating the variable-speed rotor at a maximum rotation rate in a first direction opposite to the second direction, and a rotation rate controller which issues a speed instruction to the variable-speed motor and controls a rotation rate of the variable-speed motor, wherein, when a torque direction of the variable-speed motor is the second direction, an instruction value of the speed instruction is held or a rate of change of the instruction value of the speed instruction is reduced to below a rate of change of the instruction value of the speed instruction at that time.

Advantageous Effects of Invention

According to the present invention, it is possible to prevent the reverse contact of a drive gear driven by a driving force of a variable-speed motor.

DESCRIPTION OF EMBODIMENTS

Hereinafter, a variable speed accelerator according to an embodiment of the present invention will be described in detail with reference to the drawings.

Figure 1:
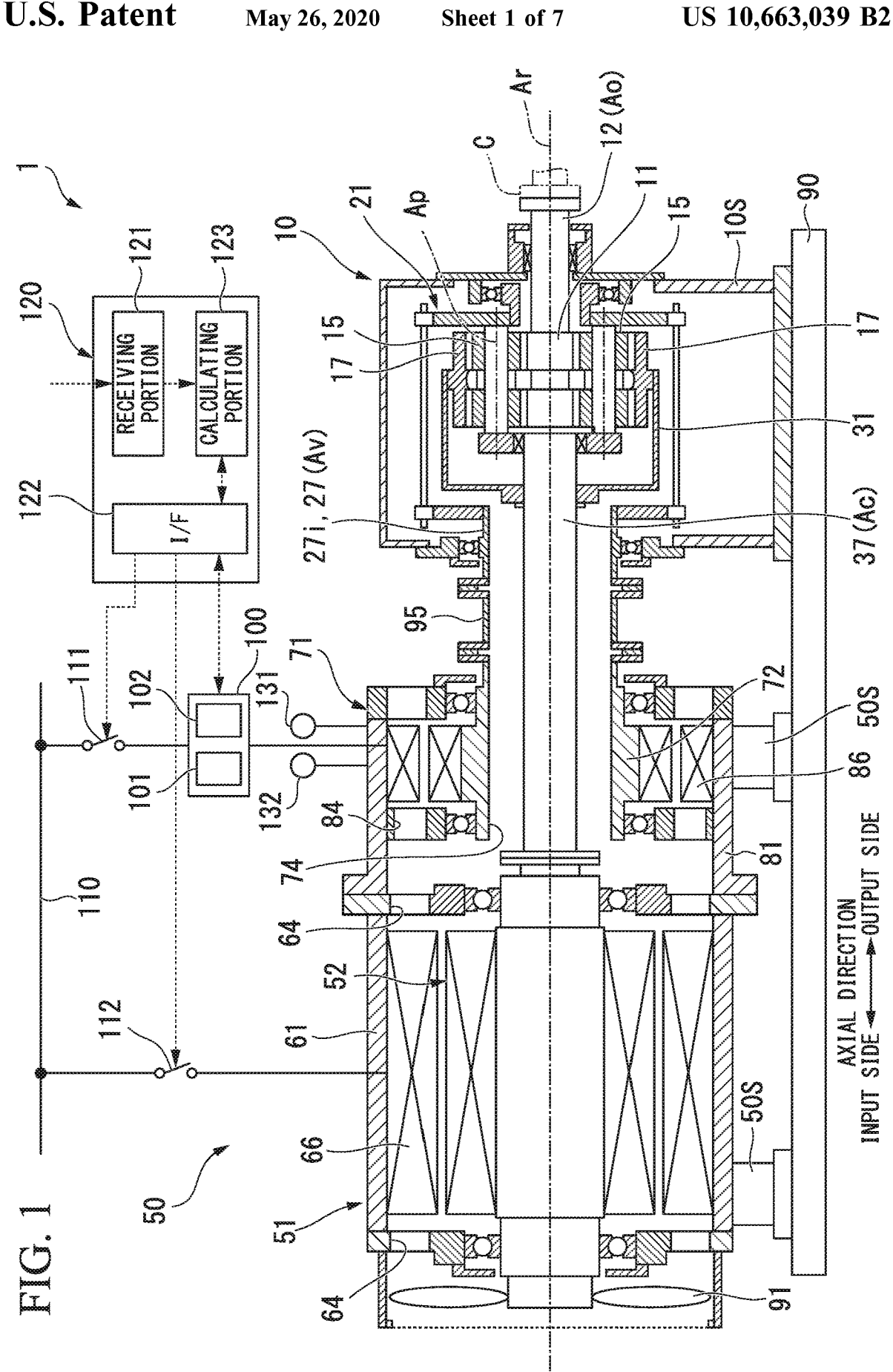
FIG. 1 is a cross-sectional view of a variable speed accelerator according to an embodiment of the present invention.

As shown in FIG. 1, the variable speed accelerator 1 of the embodiment includes an electric driving device 50 which generates a rotational driving force, and a transmission device 10 which changes the speed of a rotational driving force generated by the electric driving device 50 and then transmits the speed-changed rotational driving force to a driving target. The variable speed accelerator 1 can be applied to, for example, a fluid mechanical system such as a compressor system.

A driving target in the variable speed accelerator 1 of the embodiment is a compressor C.

The transmission device 10 is a planetary gear transmission device.

The electric driving device 50 includes a constant-speed motor 51 having a constant-speed rotor 52 which rotates at a constant speed, and a variable-speed motor 71 having a variable-speed rotor 72 which rotates at an arbitrary rotation rate. Each of the constant-speed rotor 52 and the variable-speed rotor 72 is connected to the transmission device 10.

The electric driving device 50 is supported on a frame 90 by an electric driving device support portion 50S. The transmission device 10 is supported on the frame 90 by a transmission device support portion 10S. The electric driving device 50 and the transmission device 10 which are heavy objects can be securely fixed by these support portions.

Figure 2:
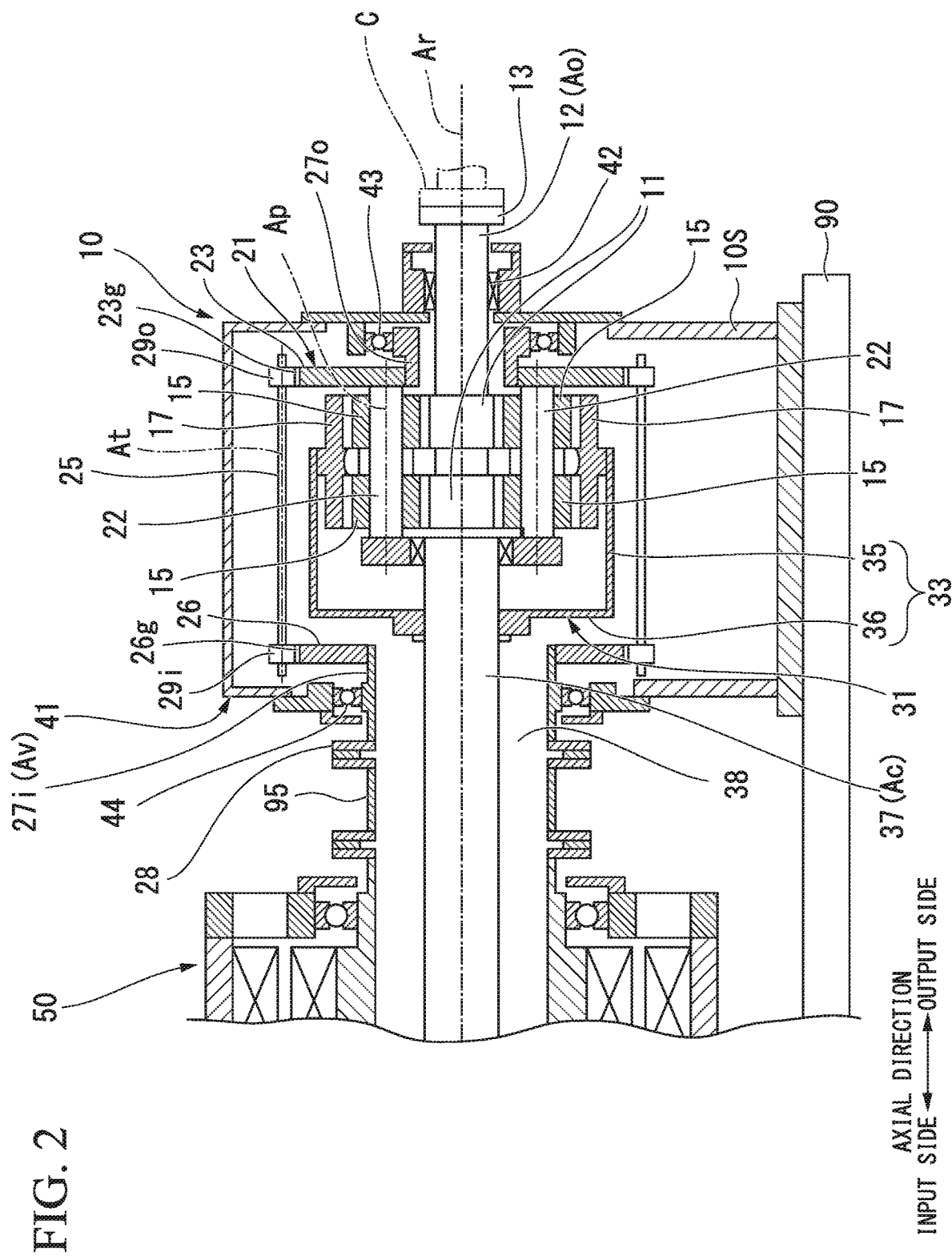
FIG. 2 is a cross-sectional view of a transmission device according to the embodiment of the present invention.

As shown in FIG. 2, the transmission device 10 includes a sun gear 11 which rotates about an axis Ar extending in a horizontal direction, a sun gear shaft 12 fixed to the sun gear 11, a plurality of planetary gears 15 which mesh with the sun gear 11, revolve around the axis Ar and rotate about their own center lines Ap, an internal gear 17 in which a plurality of teeth are arranged in an annular shape around the axis Ar and which meshes with the plurality of planetary gears 15, a planetary gear carrier 21 which supports the plurality of planetary gears 15 to allow the plurality of planetary gears 15 to revolve around the axis Ar and to rotate about their own center lines Ap, an internal gear carrier 31 which supports the internal gear 17 to allow the internal gear 17 to rotate about the axis Ar, and a transmission casing 41 which covers these elements.

Hereinafter, a direction in which the axis Ar extends is defined as an axial direction, one side in the axial direction is defined as an output side, and a side opposite to the output side is defined as an input side. Also, a radial direction around the axis Ar is simply referred to as a radial direction. In the variable speed accelerator 1 of the embodiment, the electric driving device 50 is disposed on the input side in the axial direction, and the transmission device 10 is disposed on the output side of the electric driving device 50. The compressor C is disposed on the output side of the variable speed accelerator 1.

The sun gear shaft 12 has a circular column shape centered on the axis Ar and extends from the sun gear 11 toward the output side in the axial direction. A flange 13 is formed at an output-side end of the sun gear shaft 12. For example, a rotor of the compressor C which serves as a driving target is connected to the flange 13. The sun gear shaft 12 is supported to be rotatable about the axis Ar by a sun gear bearing 42 disposed on the output side of the sun gear 11. The sun gear bearing 42 is installed at the transmission casing 41.

The planetary gear carrier 21 includes a planetary gear shaft 22 provided for each of the plurality of planetary gears 15, a carrier main body 23 which fixes the relative positions of the plurality of planetary gear shafts 22, and an output-side planetary gear carrier shaft 27o which extends in the axial direction centered on the axis Ar. The output-side planetary gear carrier shaft 27o is fixed to an inner side of the carrier main body 23 in the radial direction.

The planetary gear shaft 22 passes through the center lines Ap of the planetary gears 15 in the axial direction and supports the planetary gears 15 to allow the planetary gears 15 to rotate about a center line thereof. The carrier main body 23 extends outward in the radial direction from the plurality of planetary gear shafts 22.

The output-side planetary gear carrier shaft 27o extends from the carrier main body 23 toward the output side. The output-side planetary gear carrier shaft 27o is formed in a cylindrical shape centered on the axis Ar.

The output-side planetary gear carrier shaft 27o is supported to be rotatable about the axis Ar by a planetary gear carrier bearing 43. The planetary gear carrier bearing 43 is installed at the transmission casing 41. The sun gear shaft 12 is inserted through the inner circumferential side of the output-side planetary gear carrier shaft 27o.

The transmission device 10 includes an input-side planetary gear carrier shaft 27i which is connected to the variable-speed rotor 72 of the variable-speed motor 71, and a transmitting shaft 25 which transmits rotation of the input-side planetary gear carrier shaft 27i to the planetary gear carrier 21.

The input-side planetary gear carrier shaft 27i is formed in a cylindrical shape centered on the axis Ar. The input-side planetary gear carrier shaft 27i is disposed on the input side of the transmission device 10 and is supported by the planetary gear carrier bearing 44 to be rotatable about the axis Ar. The planetary gear carrier bearing 44 is installed at the transmission casing 41. An internal gear carrier shaft 37 for driving the internal gear carrier 31 of the transmission device 10 is inserted through the inner circumferential side of the input-side planetary gear carrier shaft 27i.

An annular flange 28 which expands outward in the radial direction is formed at the input-side end of the input-side planetary gear carrier shaft 27i. An input-side arm portion 26 which extends outward in the radial direction is formed on the output-side end of the input-side planetary gear carrier shaft 27i.

The transmitting shaft 25 is supported to be rotatable about the axis At. The transmitting shaft 25 is installed at the transmission casing 41 via a bearing (not shown). An input-side transmitting gear 29i and an output-side transmitting gear 29o are fixed to both ends of the transmitting shaft 25.

The input-side transmitting gear 29i meshes with a drive gear 26g formed on the outer circumference of the input-side arm portion 26. The output-side transmitting gear 29o meshes with a gear 23g formed on the outer circumference of the carrier main body 23. Accordingly, the rotation of the input-side planetary gear carrier shaft 27i is transmitted to the planetary gear carrier 21 via the transmitting shaft 25.

The internal gear carrier 31 includes a carrier main body 33 to which the internal gear 17 is fixed, and the internal gear carrier shaft 37 which is fixed to the carrier main body 33 and extends in the axial direction centered on the axis Ar.

The carrier main body 33 includes a cylindrical portion 35 which has a cylindrical shape centered on the axis Ar and has the internal gear 17 fixed to the inner circumferential side thereof, and an input-side arm portion 36 which extends inward in the radial direction from the input-side end of the cylindrical portion 35.

The internal gear carrier shaft 37 having a column shape around the axis Ar is disposed on the input side of the sun gear shaft 12 having a column shape around the axis Ar. The input-side arm portion 36 of the carrier main body 33 is fixed to the internal gear carrier shaft 37. The internal gear carrier shaft 37 is inserted through the inner circumferential side of the cylindrical input-side planetary gear carrier shaft 27i.

Figure 3:
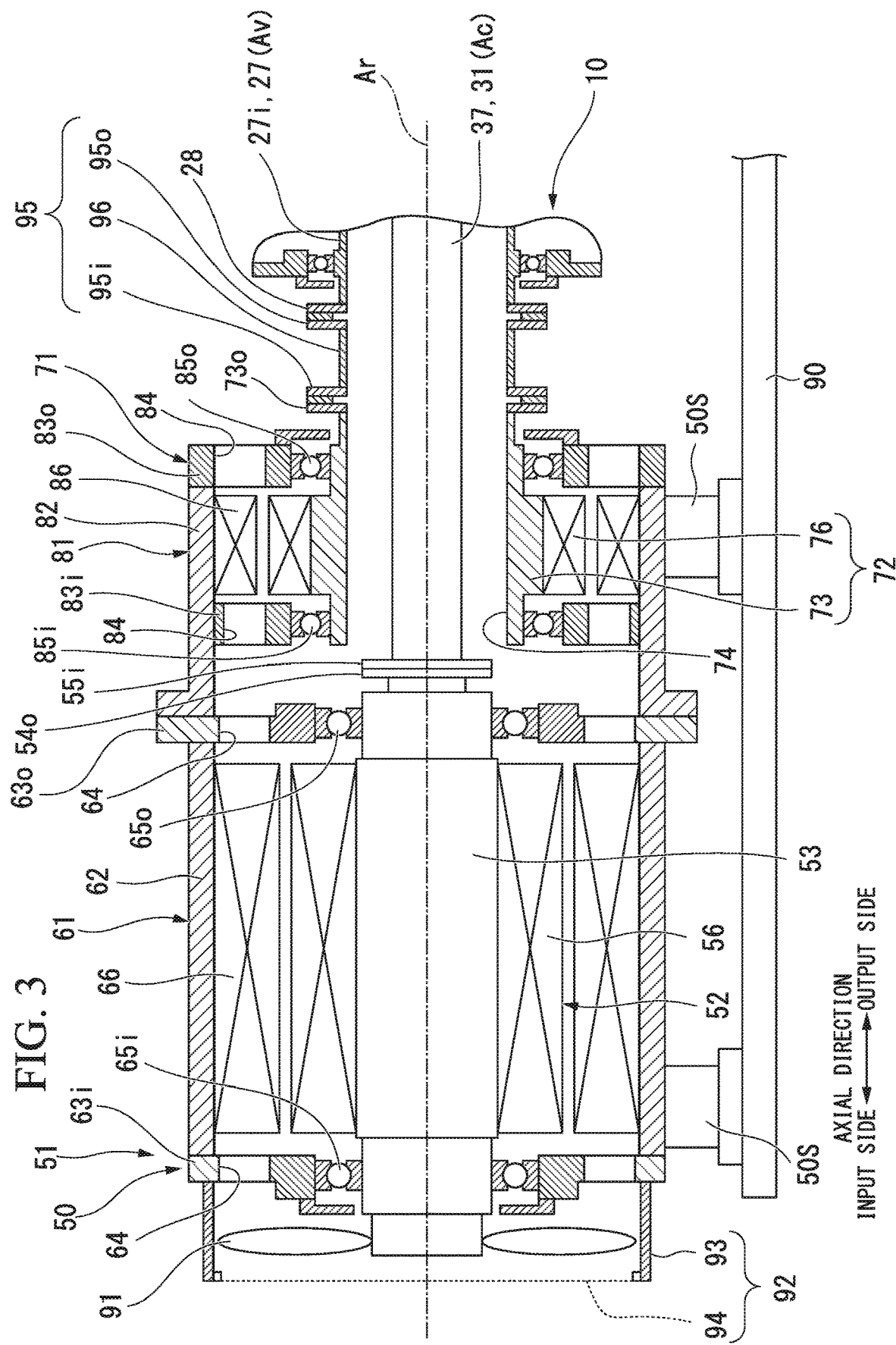
FIG. 3 is a cross-sectional view of an electric driving device according to an embodiment of the present invention.

As shown in FIG. 3, the constant-speed motor 51 rotationally drives the internal gear carrier shaft 37 of the transmission device 10. The variable-speed motor 71 rotationally drives the input-side planetary gear carrier shaft 27i of the transmission device 10. The electric driving device 50 has a cooling fan 91 which cools the constant-speed motor 51 and a fan cover 92 which covers the cooling fan 91.

The internal gear carrier shaft 37 is a constant-speed input shaft Ac which rotates at a constant speed under a driving force of the constant-speed motor 51. The input-side planetary gear carrier shaft 27i is a variable speed input shaft Av which rotates at an arbitrary rotation rate under a driving force of the variable-speed motor 71.

The variable speed accelerator 1 can change the rotation rate of an output shaft Ao of the transmission device 10 connected to the driving target by changing the rotation rate of the variable-speed motor 71.

In the embodiment, the constant-speed motor 51 is, for example, a four-pole three-phase induction motor. Further, the variable-speed motor 71 is an eight-pole three-phase induction motor having more poles than the constant-speed motor 51. The specifications of the constant-speed motor 51 and the variable-speed motor 71 are not limited to these and can be appropriately changed.

The constant-speed motor 51 includes a constant-speed rotor 52 which rotates about the axis Ar and is connected to the internal gear carrier shaft 37 which is the constant-speed input shaft Ac of the transmission device 10, a constant-speed stator 66 disposed on the outer circumferential side of the constant-speed rotor 52, and a constant-speed motor casing 61 in which the constant-speed stator 66 is fixed to the inner circumferential side thereof.

The constant-speed rotor 52 includes a constant-speed rotor shaft 53 which has a column shape around the axis Ar, and a conductive body 56 fixed to the outer circumference of the constant-speed rotor shaft 53. The cooling fan 91 is fixed to the input side end of the constant-speed rotor shaft 53.

The constant-speed stator 66 is disposed radially outward from the conductive body 56 of the constant-speed rotor 52. This constant-speed stator 66 is formed of a plurality of coils.

The constant-speed motor casing 61 includes a casing main body 62 having a cylindrical shape centered on the axis Ar and in which the constant-speed stator 66 is fixed to the inner circumferential side thereof, and covers 63i and 63o which close both axial ends of the cylindrical casing main body 62. Constant-speed rotor bearings 65i and 65o are installed at the respective covers 63i and 63o to rotatably support the constant-speed rotor shaft 53 about the axis Ar. A plurality of openings 64 axially passing through the respective covers 63i and 63o at positions radially outward from the constant speed rotor bearing 65i are formed in the respective covers 63i and 63o.

The input-side end of the constant-speed rotor shaft 53 protrudes toward the input side from the input-side cover 63i of the constant-speed motor casing 61. The cooling fan 91 is fixed to the input-side end of the constant-speed rotor shaft 53.

When the constant-speed rotor 52 rotates, the cooling fan 91 also rotates integrally with the constant-speed rotor 52. The fan cover 92 includes a cylindrical cover main body 93 disposed on the outer circumferential side of the cooling fan 91, and an air circulating plate 94 installed at an opening of the cover main body 93 on the inlet side and having a plurality of air holes formed therein. The fan cover 92 is fixed to the cover 63i of the constant-speed motor casing 61 on the input side.

The variable-speed motor 71 includes a variable-speed rotor 72 which rotates about the axis Ar and is connected to the input-side planetary gear carrier shaft 27i which is the variable-speed input shaft Av, a variable-speed stator 86 disposed on the outer circumferential side of the variable-speed rotor 72, and a variable-speed motor casing 81 in which the variable-speed stator 86 is fixed to the inner circumferential side thereof.

The variable-speed rotor 72 has a variable-speed rotor shaft 73 and a conductive body 76 fixed to the outer circumference of the variable-speed rotor shaft 73. The variable-speed rotor shaft 73 has a cylindrical shape around the axis Ar and has a shaft insertion hole 74 passing through the variable-speed rotor shaft 73 in the axial direction. The internal gear carrier shaft 37 is inserted through the shaft insertion hole 74 of the variable-speed rotor shaft 73 as the constant-speed input shaft Ac. An annular flange 73o expanding radially outward is formed at the output-side end of the variable-speed rotor shaft 73.

The variable-speed stator 86 is disposed radially outward from the conductive body 76 of the variable-speed rotor 72. The variable-speed stator 86 is formed of a plurality of coils.

The variable-speed motor casing 81 includes a casing main body 82 having a cylindrical shape around the axis Ar and to the inner circumferential side of which the variable-speed stator 86 is fixed, an output-side cover 83o which closes the output-side end of the cylindrical casing main body 82, and an inlet-side cover 83i disposed on the input side of the variable-speed stator 86 and fixed to the inner circumferential side of the cylindrical casing main body 82. Variable-speed rotor bearings 85i and 85o which rotatably support the variable-speed rotor shaft 73 about the axis Ar are installed at the respective covers 83i and 83o. In the respective covers 83i and 83o, a plurality of openings 84 passing through the respective covers 83i and 83o in the axial direction are formed at positions radially outward from the variable-speed rotor bearings 85i and 85o.

A space in the variable-speed motor casing 81 and a space in the constant-speed motor casing 61 communicate with each other through the plurality of openings 84 formed in the respective covers 83i and 83o of the variable-speed motor casing 81 and the plurality of openings 64 formed in the respective covers 63i and 63o of the constant-speed motor casing 61.

Further, in the variable speed accelerator 1 of the embodiment, the constant-speed rotor 52, the variable-speed rotor 72 and the sun gear shaft 12 are arranged on the same axis.

Figure 4:
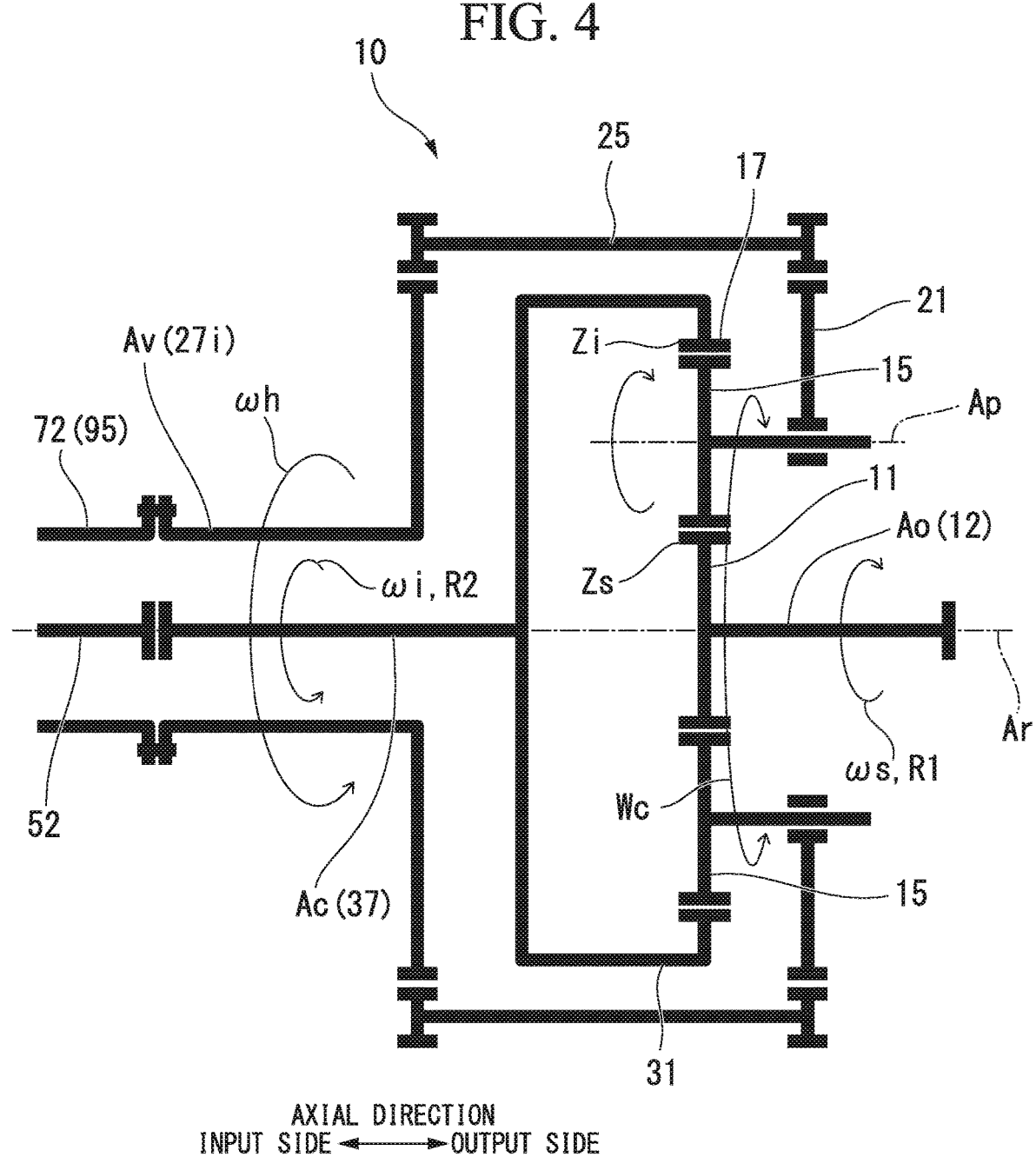
FIG. 4 is a schematic diagram showing a constitution of the transmission device according to the embodiment of the present invention.

As shown in FIG. 4, the constant-speed motor 51 is set to rotate the constant-speed rotor 52 (internal gear 17) in the second direction R2 in the circumferential direction of the axis Ar by supplying the electric power to the constant-speed motor 51. As the constant-speed rotor 52 rotates in the second direction R2, the internal gear carrier shaft 37 and the internal gear carrier 31 rotate in the second direction R2.

The output shaft Ao of the transmission device 10 is set to rotate in the first direction R1 opposite to the second direction R2 by the constant-speed rotor 52 of the constant speed motor 51 rotating at the maximum rotation rate in the second direction R2. That is, the forward rotation of the constant-speed motor 51 is the second direction R2, and the forward rotation of the output shaft Ao of the transmission device 10 is the first direction R1. The compressor C operates normally as the output shaft Ao rotates forward.

In the following description, the rotation direction of the first direction R1 is referred to as a positive (positive) rotation direction, and the rotation direction of the second direction R2 is referred to as a negative (negative) rotation direction. For example, the maximum rotation rate of the constant-speed motor 51 is −1800 rpm.

The transmission device 10 is configured so that the planetary gear carrier 21 rotates in the first direction R1 as the variable-speed rotor 72 rotates in the first direction R1.

The variable-speed motor 71 rotationally drives the variable-speed rotor 72 (planetary gear carrier 21) in the first direction R1 and the second direction R2 which are the circumferential directions of the axis Ar. That is, the variable-speed motor 71 can rotate forward and in reverse. The rotation rate of the output shaft Ao of the transmission device 10 in the first direction R1 is increased by increasing the rotation rate of the variable-speed rotor 72 in the first direction R1. As the variable-speed rotor 72 rotates at the maximum rotation rate in the first direction R1, the output shaft Ao rotates at the maximum rotation rate.

The variable-speed motor 71 serves as a generator by rotating the variable-speed rotor 72 by an external force. A state in which the variable-speed motor 71 serves as a generator is referred to as a generator mode.

The variable-speed motor 71 serves as an electric motor by supplying the electric power. A state in which the variable-speed motor 71 serves as an electric motor is referred to as an electric motor mode.

The variable speed accelerator 1 of the embodiment includes a rotation rate controller 100 (inverter) which controls the rotation rate of the variable-speed motor 71, a variable-speed motor switch 111 which sets the variable-speed motor 71 to be in a power supply state and a power cutoff state, a constant-speed motor switch 112 which sets the constant-speed motor 51 to be in the power supply state and the power cutoff state, and a controller 120 which controls operations of the rotation rate controller 100, the variable-speed motor switch 111 and the constant-speed motor switch 112.

The controller 120 is constituted of a computer. The controller 120 includes a receiving portion 121 which directly receives an instruction from an operator or receives an instruction from a host control device, an interface 122 which provides instructions to the variable-speed motor switch 111, the rotation rate controller 100 and the constant-speed motor switch 112, and a calculating portion 123 which creates an instruction value ωh'(frequency) for the variable-speed motor switch 111, the constant-speed motor switch 112, and the rotation rate controller 100 according to the instructions received by the receiving portion 121 or the like.

The variable-speed motor switch 111 is electrically connected to a power source line 110 and the rotation rate controller 100. The rotation rate controller 100 is electrically connected to the variable-speed motor 71. The constant-speed motor switch 112 is electrically connected to the power source line 110 and the constant-speed motor 51.

The variable-speed motor switch 111 is turned on by an ON instruction from the controller 120 and turned off by an OFF instruction from the controller 120. When the variable-speed motor switch 111 is turned on, electric power from the power source line 110 is supplied to the variable-speed motor 71 through the rotation rate controller 100, and the variable-speed motor 71 is in the power supply state. When the variable-speed motor switch 111 is turned off, the power supply from the power source line 110 to the rotation rate controller 100 and the variable-speed motor 71 is cut off, and the variable-speed motor 71 is in the power cutoff state.

The constant-speed motor switch 112 is turned on by an ON instruction from the controller 120 and turned off by an OFF instruction from the controller 120. When the constant-speed motor switch 112 is turned on, the electric power from the power source line 110 is supplied to the constant-speed motor 51, and the constant-speed motor 51 is in the power supply state. When the constant-speed motor switch 112 is turned off, the power supply from the power source line 110 to the constant-speed motor 51 is cut off, and the constant-speed motor 51 is in the power cutoff state.

The rotation rate controller 100 includes a frequency conversion portion 101 which changes a frequency of the electric power supplied from the power source line 110, and a rotation direction-switching portion 102 which changes a rotation direction of the variable-speed motor 71.

The frequency conversion portion 101 supplies the electric power having a frequency corresponding to the instruction value ωh' of the rotation rate of the variable-speed motor 71 instructed by the controller 120 to the variable-speed motor 71. The variable-speed rotor 72 of the variable-speed motor 71 rotates at a rotation rate corresponding to this frequency. Since the rotation rate of the variable-speed rotor 72 changes in this manner, the rotation rate of the planetary gear carrier 21 of the transmission device 10 connected to the variable-speed rotor 72 also changes. As a result, the rotation rate of the sun gear shaft 12 which is the output shaft Ao of the transmission device 10 also changes.

The rotation direction-switching portion 102 is a device which changes the rotation direction of the variable-speed motor 71 by using a circuit for switching a plurality of (three in the case of the embodiment) power source lines connected to the variable-speed motor 71. That is, the rotation direction-switching portion 102 can rotate the variable-speed rotor 72 forward and in reverse.

The variable speed accelerator 1 of the embodiment includes a rotation rate sensor 131 which measures a rotation rate wh of the variable-speed motor 71 (variable-speed rotor 72). Further, the variable speed accelerator 1 of the embodiment includes a torque sensor 132 which measures a torque T of the variable-speed motor 71 (variable-speed rotor 72).

The rotation rate wh and the torque T measured by these sensors are transmitted to the controller 120.

Here, the relationship between the number of teeth of each gear of the transmission device 10 and the rotation rate of each shaft of the transmission device 10 will be described with reference to FIG. 4.

The rotation rate of the sun gear shaft 12 as the output shaft Ao is indicated by ωs, the rotation rate of the internal gear carrier shaft 37 (constant-speed motor 51) that is the constant-speed input shaft Ac is indicated by ωi, and the rotation rate of the input-side planetary gear carrier shaft 27i (variable-speed motor 71) that is the variable-speed input shaft Av is indicated by ωh. Further, the number of teeth of the sun gear 11 is indicated by Zs, and the number of teeth of the internal gear 17 is indicated by Zi.

Also, a ratio ωs/ωi of the rotation rate ωs of the output shaft Ao to the rotation rate ωi of the constant-speed motor 51 is indicated by U. The ratio U of the rotation rate ωs of the output shaft Ao to the rotation rate ωi of the constant-speed motor 51 is the same as a ratio Zi/Zs of the number of teeth Zi of the internal gear 17 to the number of teeth Zs of the sun gear 11.

Also, a ratio ωc/ωh of the rotation rate we of the planetary gear carrier 21 to the rotation rate ωh of the variable-speed motor 71 is indicated by P.

The relationship between the number of teeth of each gear and the rotation rate of each shaft in the transmission device 10 can be expressed by the following Formula (1):

$$\omega s/\omega i = P \times \omega h/\omega i - (1 - P \times \omega h/\omega i) \times U \quad (1)$$

When the constant-speed motor 51 is a four-pole induction motor and the power source frequency is 60 Hz, the rotation rate ωi (rated rotation rate) of the constant-speed rotor 52 (constant-speed input shaft Ac) is 1,800 rpm. Further, when the variable-speed motor 71 is an eight-pole induction motor and the power supply frequency is 60 Hz, the maximum rotation rate ωh (rated rotation rate) of the variable-speed rotor 72 (variable-speed input shaft Av) is 900 rpm.

Further, the ratio U of the rotation rate ωs of the output shaft Ao to the rotation rate ωi of the constant-speed motor 51 (ratio Zi/Zs of the number of teeth Zs of the sun gear 11 to the number of teeth Zi of the internal gear 17) is set to 4.

Furthermore, the ratio P of the rotation rate ωc of the planetary gear carrier 21 to the rotation rate ωh of the variable-speed motor 71 is set to 0.3.

In this case, when the rotation direction of the constant-speed rotor 52 (internal gear 17) is the rotation (−1,800 rpm) in the second direction R2 and the rotation direction of the variable-speed rotor 72 (planetary gear carrier 21) has the maximum rotation rate (900 rpm) in a direction opposite to the rotation of the constant-speed rotor 52 (rotation in the first direction R1), the rotation rate ωs of the sun gear shaft 12 which is the output shaft Ao is 8,550 rpm. This rotation rate (8,550 rpm) is the maximum rotation rate of the sun gear shaft 12.

That is, in the transmission device 10 of the embodiment, the rotation rate ωs of the output shaft Ao becomes the maximum rotation rate when the internal gear 17 corresponding to the constant-speed input shaft Ac rotates at −1,800 rpm and the planetary gear carrier 21 corresponding to the variable-speed input shaft Av rotates at 900 rpm.

Assuming that a variable speed range of the variable-speed input shaft Av is from −900 rpm to +900 rpm, the rotation rate ωs of the output shaft Ao lowers as the rotation rate of the variable-speed input shaft Av approaches −900 rpm.

The controller 120 of the variable speed accelerator 1 of the embodiment has a function of preventing reverse contact of the drive gear 26g driven by the variable-speed motor 71 on the basis of measured values (rotational speed ωh and torque T of the variable-speed motor 71) measured by the sensors.

Figure 5:
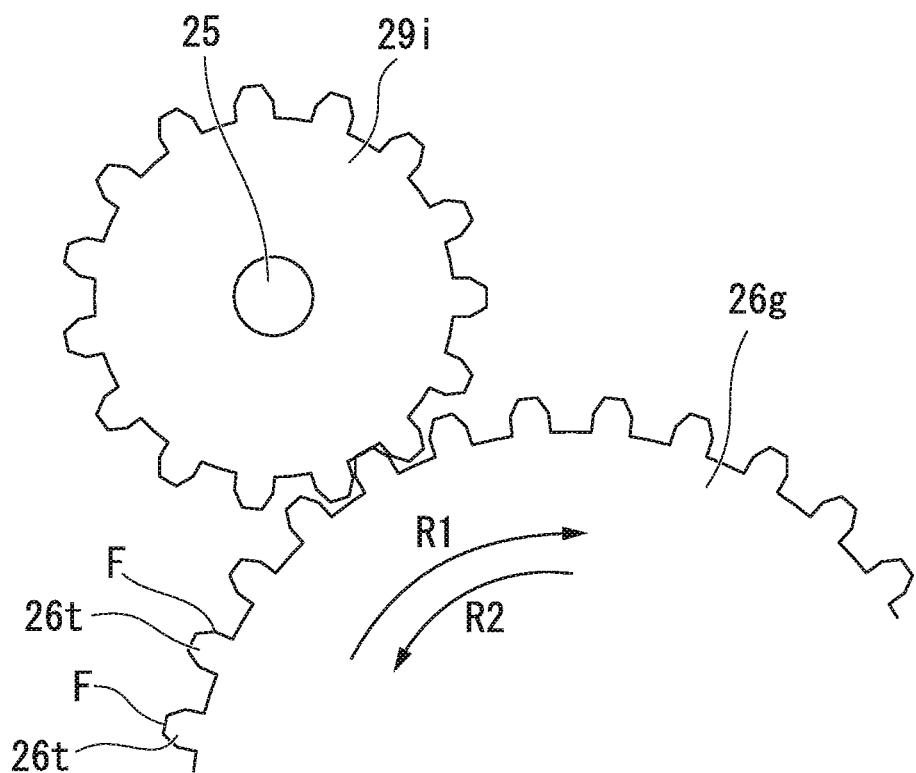
FIG. 5 is a schematic diagram explaining reverse contact in the transmission device according to the embodiment of the present invention.

FIG. 5 is a diagram explaining the reverse contact of the drive gear 26g. The term "reverse contact" refers to a phenomenon in which a surface transmitting a force among both surfaces facing the circumferential direction of the teeth 26t of the drive gear 26g becomes a surface opposite to a surface F directed in the first direction R1.

In other words, a direction of the torque T of the variable-speed motor 71 is opposite to a direction of the normal torque. The direction of the normal torque is a direction of the torque of the variable-speed motor 71 when the variable-speed motor 71 in the electric motor mode rotates the output shaft Ao (compressor C) of the variable speed accelerator 1 (the transmission device 10) at the maximum rotation rate.

In the variable speed accelerator 1 of the embodiment, during a normal operation, the surface F of the teeth 26t of the drive gear 26g which faces in the first direction R1 transmits a force to the input-side transmitting gear 29i which is a driven gear (rightly contacted state).

However, for example, when it is intended to suddenly lower the rotation rate ωh of the variable-speed motor 71, or when a load of the compressor C as a driving target is abruptly lowered, the direction of the torque T of the variable-speed motor 71 may be opposite to the direction of the normal torque (the second direction R2). In such a case, reverse contact occurs.

Next, a control method of the variable speed accelerator 1 according to the embodiment will be described.

Figure 6:
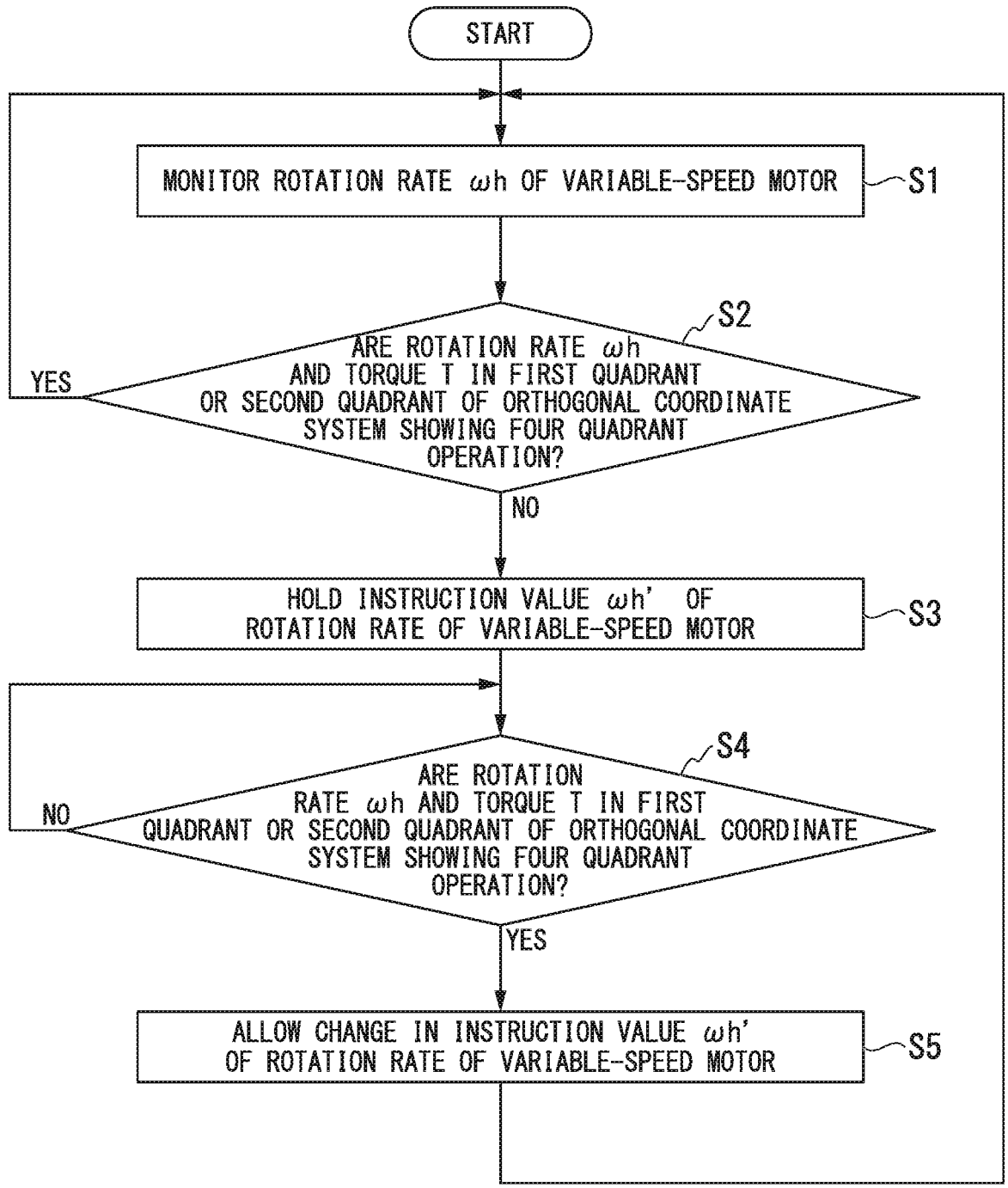
FIG. 6 is a flowchart showing an operation of a controller according to the embodiment of the present invention.

As shown in FIG. 6, the control method of the variable speed accelerator 1 according to the embodiment includes a monitoring step S1 of monitoring the torque T of the variable-speed motor 71 and the rotation rate ωh of the variable-speed motor 71, a first determination step S2 of determining whether or not the rotation rate ωh and the torque T are in a first quadrant or a second quadrant in an orthogonal coordinate system indicating a four quadrant operation, an instruction value-holding step S3 of holding an instruction value ωh' of the rotation rate of the variable-speed motor 71 when conditions of the first determination step S2 are not satisfied, a second determination step S4 of determining whether or not the rotation rate ωh and the torque T are in the first quadrant or the second quadrant of the orthogonal coordinate system indicating a four quadrant operation, and an instruction value-changing step S5 of allowing change of the instruction value ωh' of the rotation rate of the variable-speed motor 71 when conditions of the second determination step S4 are satisfied.

In the rotation rate-monitoring step S1, the controller 120 monitors the rotation rate ωh of the variable-speed motor 71 and the torque T of the variable-speed motor 71.

Figure 7:
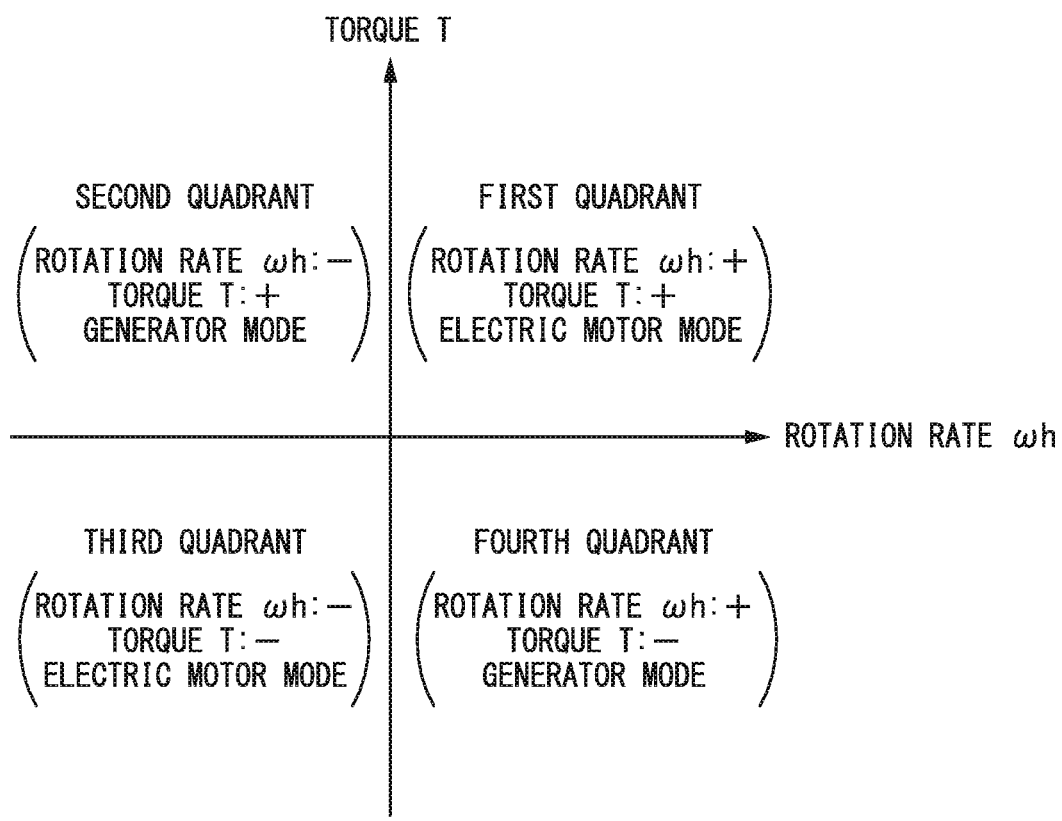
FIG. 7 is an orthogonal coordinate system showing a four quadrant operation in which torque of a variable-speed motor is on the vertical axis and a rotation rate of the variable-speed motor is on the horizontal axis.

Here, the variable-speed motor 71 of the embodiment has four kinds of operation mode according to a combination of the rotation direction and the torque direction. The variable-speed motor 71 of the embodiment performs a four quadrant operation as shown in FIG. 7. FIG. 7 is an orthogonal coordinate system showing the four quadrant operation in which the torque T of the variable-speed motor 71 is on the vertical axis and the rotation rate ωh of the variable-speed motor 71 is on the horizontal axis.

In the variable-speed motor 71 of the embodiment, the first quadrant of the orthogonal coordinate system indicating a four quadrant operation is in a state in which the rotation rate ωh is positive (the rotation direction is the first direction R1) and the torque T is positive (the direction of the torque is the first direction R1) and the variable-speed motor 71 drives the compressor C. The first quadrant is a performance region of powering control (electric motor mode) in which electric power is supplied to the variable-speed motor 71.

In the variable-speed motor 71 of the embodiment, the second quadrant of the orthogonal coordinate system indicating a four quadrant operation is in a state in which the rotation rate ωh is negative (the rotation direction is the second direction R2) and the torque T is positive (the direction of the torque is the first direction R1) and the variable-speed motor 71 generates a positive torque to brake the compressor C. The second quadrant is a performance region of regenerative control (generator mode) in which rotational energy of the variable-speed motor 71 and the compressor C is charged.

In the first quadrant and the second quadrant, since the direction of the torque T of the variable-speed motor 71 is positive, the torque T of the variable-speed motor 71 is transmitted to the input-side transmitting gear 29i, which is a driven gear, via the surface F of the teeth 26t (refer to FIG. 5) of the drive gear 26g which is directed in the first direction R1. That is, the drive gear 26g and the input-side transmitting gear 29i are rightly contacted with each other.

According to the variable-speed motor 71 of the embodiment, in a third quadrant of the orthogonal coordinate system indicating a four quadrant operation, the rotation rate ωh is negative (the rotation direction is the second direction R2), and the torque T is negative (the torque direction is the second direction R2). The third quadrant is a performance region of the powering control in which electric power is supplied to the variable-speed motor 71.

According to the variable-speed motor 71 of the embodiment, in a fourth quadrant of the orthogonal coordinate system indicating a four quadrant operation, the rotation rate ωh is positive (the rotation direction is the first direction R1), and the torque T is negative (the torque direction is the second direction R1). The fourth quadrant is a performance region of regenerative control in which the rotational energy of the variable-speed motor 71 and the compressor C is charged.

In the third quadrant and the fourth quadrant, since the direction of the torque T of the variable-speed motor 71 is negative, the torque T of the variable-speed motor 71 is transmitted to the input-side transmitting gear 29i, which is a driven gear, via the surface of the teeth 26t of the drive gear 26g directed in the second direction R2. That is, the drive gear 26g and the input-side transmitting gear 29i are in a reverse state.

In the first determination step S2, it is determined whether or not the rotation rate ωh and the torque T are in the first quadrant or the second quadrant of the orthogonal coordinate system indicating a four quadrant operation. When the rotation rate ωh and the torque T are in the first quadrant or the second quadrant, that is, when the drive gear and the driven gear are rightly contacted, the process returns to the rotation rate-monitoring step S1.

When the rotation rate ωh and the torque T are not in the first quadrant or the second quadrant, that is, when the drive gear and the driven gear are in the reverse state, the process proceeds to the instruction value-holding step S3.

In the instruction value-holding step S3, the instruction value ωh' of the rotation rate of the variable-speed motor 71 is held. That is, in the reverse state, it is assumed that the instruction value ωh' of the rotation rate of the variable-speed motor 71 would change greatly, and thus the instruction value ωh' of the rotation rate of the variable-speed motor 71 is held so that the frequency of the electric power supplied to the variable-speed motor 71 is not changed.

Accordingly, an increase in the torque directed in the second direction R2 is minimized, and it is possible to prevent the reverse contact of the gears constituting the transmission device 10.

In the second determination step S4, while the instruction value ωh' of the rotation rate of the variable-speed motor 71 is held, it is determined whether or not the rotation rate ωh and the torque T are in the first quadrant or the second quadrant of the orthogonal coordinate system indicating a four quadrant operation. When the rotation rate ωh and the torque T are not in the first quadrant or the second quadrant, the state in which the instruction value ωh' of the rotation rate of the variable-speed motor 71 is held is maintained.

When the rotation rate ωh and the torque T are in the first quadrant or the second quadrant, the process proceeds to the instruction value-changing step S5.

In the instruction value-changing step S5, it is possible to change the instruction value ωh' of the rotation rate of the variable-speed motor 71.

According to the above-described embodiment, it is possible to prevent the drive gear 26g of the variable-speed motor 71 and the input-side transmitting gear 29i which is a driven gear from being in the reverse state during the operation of the variable speed accelerator 1.

That is, it is possible to prevent the gears of the transmission device 10 from being in the reverse state by monitoring the direction of the torque T of the variable-speed motor 71.

Also, the reverse contact of the gears can be prevented by monitoring the rotation rate ωh of the variable-speed motor 71 and the output frequency of the rotation rate controller 100 (inverter) instead of the torque T of the variable-speed motor 71.

In addition, in the embodiment, the internal gear carrier shaft 37 which is a rod-shaped shaft is inserted through the variable-speed rotor shaft 73 which is a cylindrical shaft in which the shaft insertion hole 74 is formed. That is, the constant-speed input shaft Ac having a large output is inserted through the variable-speed rotor shaft 73 of the variable-speed motor 71 having a smaller output than the constant-speed motor 51. Accordingly, as the constant-speed motor 51, one having a larger output (horsepower) can be adopted.

Further, in the embodiment, the whole apparatus can be made more compact by arranging the constant-speed motor 51, the variable-speed motor 71, the transmission device and the compressor C linearly in this order.

Further, in the above-described embodiment, when the rotation rate ωh and the torque T are not in the first quadrant or the second quadrant (when the drive gear and the driven gear are in the reverse state), the instruction value ωh' is held. However, the present invention is not limited thereto. When the rotation rate ωh and the torque T are not in the first quadrant or the second quadrant, a rate of change of the instruction value ωh' may be lower than a rate of change of an instruction value ωh' of a speed instruction at that time.

For example, when the instruction value ωh' is changed from 900 rpm to 500 rpm over 1 second and the torque T of the variable-speed motor 71 becomes negative, the instruction value ωh' may be changed with a rate of change lower than this rate of change (400 rpm/second).

Further, in the above-described embodiment, the drive gear which is a target for monitoring for reverse contact is the drive gear 26g formed on the outer circumference of the input-side arm portion 26 and the driven gear is the input-side transmitting gear 29i, but the present invention is not limited thereto. The drive gear which is a target for monitoring for reverse contact may be a gear driven by the variable-speed motor 71.

Further, in the above-described embodiment, the variable-speed rotor shaft 73 is formed in a cylindrical shape and the internal gear carrier shaft 37 is inserted through the shaft insertion hole 74 of the variable-speed rotor shaft 73, but the present invention is not limited thereto. For example, a center axis of the variable-speed rotor 72 of the variable-speed motor 71 may be offset with respect to the axis Ar.

Further, in the above-described embodiment, a four-pole three-phase induction motor is exemplified as a constant-speed motor 51 suitable for rotating the compressor C at high speed, and an eight-pole three-phase induction motor is exemplified as a variable-speed motor 71 suitable for varying the rotation rate of the compressor C within a certain range. However, when it is unnecessary to rotate the driving target at high speed, other types of electric motors may be used as the constant-speed motor 51 and the variable-speed motor 71.

REFERENCE SIGNS LIST

1 Variable speed accelerator
10 Transmission device
11 Sun gear
12 Sun gear shaft
15 Planetary gear
17 Internal gear
21 Planetary gear carrier
22 Planetary gear shaft
27 Planetary gear carrier shaft
27i Input-side planetary gear carrier shaft
27o Output-side planetary gear carrier shaft
31 Internal gear carrier
37 Internal gear carrier shaft
41 Transmission casing
42 Sun gear bearing
50 Electric driving device
51 Constant-speed motor
52 Constant-speed rotor
53 Constant-speed rotor shaft
56 Conductive body
61 Constant-speed motor casing
66 Constant-speed stator
71 Variable-speed motor
72 Variable-speed rotor
73 Variable-speed rotor shaft
74 Shaft insertion hole
76 Conductive body
81 Variable-speed motor casing
86 Variable-speed stator
100 Rotation rate controller
101 Frequency conversion portion
102 Rotation direction switching portion
110 Power source line
111 Variable-speed motor switch
112 Constant-speed motor switch
120 Controller (control device)
121 Receiving portion
122 Interface
123 Calculating portion
131 Rotation rate sensor
132 Torque sensor
Ac Constant-speed input shaft Ao Output shaft
Ar Axis
Av Variable-speed input shaft
C Compressor
R1 First direction
R2 Second direction

The invention claimed is:

1. A variable speed accelerator, comprising:
an electric driving device which generates a rotational driving force; and
a transmission device which changes the speed of the rotational driving force generated by the electric driving device and transmits the changed rotation driving force to a driving target, wherein
the transmission device comprises
a sun gear which rotates about an axis,
a sun gear shaft which is fixed to the sun gear and extends in an axial direction around the axis,
a planetary gear which meshes with the sun gear, revolves around the axis and rotates about its own center line,
an internal gear which has a plurality of teeth aligned annularly around the axis and meshes with the planetary gear,
a planetary gear carrier which has a planetary gear carrier shaft extending in the axial direction around the axis and supports the planetary gear to revolve around the axis and to be rotatable around a center line of the planetary gear itself, and
an internal gear carrier which has an internal gear carrier shaft extending in the axial direction around the axis and supports the internal gear to be rotatable about the axis,
the sun gear shaft forms an output shaft connected to the driving target, the internal gear carrier shaft forms a constant-speed input shaft, and the planetary gear carrier shaft forms a variable-speed input shaft,
the electric driving device comprises
a constant-speed motor having a constant-speed rotor which rotates a constant-speed input shaft of the transmission device in a second direction, and
a variable-speed motor which has a variable-speed rotor connected to the variable-speed input shaft of the transmission device and which rotates the output shaft at a maximum rotation rate by rotating the variable-speed rotor at a maximum rotation rate in a first direction opposite to the second direction, and
the variable speed accelerator further comprises
a rotation rate controller which issues a speed instruction to the variable-speed motor and controls a rotation rate of the variable-speed motor,
a torque measuring device which measures a torque of the variable-speed motor, and
a control device which holds an instruction value of the speed instruction or reduces a rate of change of the instruction value of the speed instruction to below a rate of change of the instruction value of the speed instruction at that time when a torque direction of the variable-speed motor is the second direction.

2. The variable speed accelerator according to claim 1, wherein
in an orthogonal coordinate system indicating a four quadrant operation in which a torque directed in the first direction of the variable-speed motor is indicated on a vertical axis and a rotation rate in the first direction of the variable-speed motor is indicated on a horizontal axis, the control device holds the instruction value of the speed instruction or reduces the rate of change of the instruction value of the speed instruction below a rate of change of the instruction value of the speed instruction at that time when the rotation rate of the variable-speed motor and the torque of the variable-speed motor are in the third quadrant and the fourth quadrant in which the torque is negative.

3. The variable speed accelerator according to claim 1, wherein
the variable-speed rotor has a cylindrical shape centered on the axis, and the constant-speed input shaft is inserted through a shaft insertion hole which passes therethrough in the axial direction.

4. The variable speed accelerator according to claim 2, wherein
the variable-speed rotor has a cylindrical shape centered on the axis, and the constant-speed input shaft is inserted through a shaft insertion hole which passes therethrough in the axial direction.

5. A method for controlling a variable speed accelerator, the variable speed accelerator comprising
an electric driving device which generates a rotational driving force; and
a transmission device which changes the speed of the rotational driving force generated by the electric driving device and transmits the changed rotation driving force to a driving target, wherein
the transmission device comprises
a sun gear which rotates about an axis,
a sun gear shaft which is fixed to the sun gear and extends in an axial direction around the axis,
a planetary gear which meshes with the sun gear, revolves around the axis and rotates about its own center line,
an internal gear which has a plurality of teeth aligned annularly around the axis and meshes with the planetary gear,
a planetary gear carrier which has a planetary gear carrier shaft extending in the axial direction around the axis and supports the planetary gear to revolve around the axis and to be rotatable around a center line of the planetary gear itself, and
an internal gear carrier which has an internal gear carrier shaft extending in the axial direction around the axis and supports the internal gear to be rotatable about the axis,
the sun gear shaft forms an output shaft connected to the driving target, the internal gear carrier shaft forms a constant-speed input shaft, and the planetary gear carrier shaft forms a variable-speed input shaft, and
the electric driving device comprises
a constant-speed motor having a constant-speed rotor which rotates a constant-speed input shaft of the transmission device in a second direction,
a variable-speed motor which has a variable-speed rotor connected to the variable-speed input shaft of the transmission device and which rotates the output shaft at a maximum rotation rate by rotating the variable-speed rotor at a maximum rotation rate in a first direction opposite to the second direction, and
a rotation rate controller which issues a speed instruction to the variable-speed motor and controls a rotation rate of the variable-speed motor,
wherein, when a torque direction of the variable-speed motor is the second direction, an instruction value of the speed instruction is held or a rate of change of the instruction value of the speed instruction is reduced to below a rate of change of the instruction value of the speed instruction at that time.

* * * * *